June 9, 1959     R. FOLLANSBEE     2,889,991
HEATING SYSTEM

Filed Aug. 14, 1956     2 Sheets-Sheet 1

INVENTOR.
Rogers Follansbee.

June 9, 1959   R. FOLLANSBEE   2,889,991
HEATING SYSTEM
Filed Aug. 14, 1956   2 Sheets-Sheet 2

INVENTOR.
Rogers Follansbee.

United States Patent Office 2,889,991
Patented June 9, 1959

2,889,991

HEATING SYSTEM

Rogers Follansbee, Chicago, Ill.

Application August 14, 1956, Serial No. 603,952

9 Claims. (Cl. 237—2)

This invention relates to a method and apparatus for heating a building, such as a home, factory, restaurant or the like.

The invention may be described in connection with and has a particular application to electrical methods of heating, but it is to be understood that the invention may be applied to all types of heating systems.

Heretofore one of the greatest disadvantages in the use of electrical energy for heating buildings has been the absence of a practical means for storing that energy. This storability is one of the most advantageous qualities possessed by heating fuels, such as coal, gas and oil. Each of these fuels may be conveniently stored and used when needed. On the other hand because electrical heating energy could not heretofore be stored, the electrical output of the power stations was geared to the cycles of electrical demand by industry and the consuming public.

Under present conditions electric utility companies experience periods of very high electrical demand over a great part of the daylight and early evening hours. On the other hand, the utility companies experience at other times periods of considerably lower demand. If the demand for electrical energy could be more evenly distributed over the entire twenty-four hour period, that is to say, minimizing or reducing the amplitudes of the peaks and valleys of the output load, the over-all result would be a very great saving to the power companies and would undoubtedly result in a correspondingly great saving to the consumer. In many communities even now off-peak power can be purchased at a much lower rate than full peak power.

Also in recent years a great many buildings have adopted radiant heating systems. One of the disadvantages of such systems has been their inability to provide instant heat when needed. The present radiant systems are, in general, thermostatically sensitive to changes in indoor temperatures. When the temperature drops, heat is put into the radiant slab and some time later the heat begins to radiate from the slab. In the meantime the sun or household activities may have furnished additional heat to the building. Even though the radiant slab heat input is cut off, heat continues to radiate therefrom for a considerable length of time. This heat inertia or flywheel effect is many times very disagreeable and results in inefficient utilization of the energy used to heat the radiant slab. Generally speaking, in present radiant heating systems, heat is put into and comes out of the slab too late for efficient heating.

It is therefore one object of this invention to provide a heating system which utilizes off-peak power as its major source of electrical heating energy.

It is another object of this invention to provide a more efficient system of radiant heating.

It is a further object of this invention to provide a system which permits the injection of heat into the radiant heating slab in advance of the heat loss being felt inside the building.

It is still another object of this invention to provide a heating system which is responsive to and functional during even the most difficult weather conditions under which a heating system would be required to operate.

It is still a further object of this invention to provide a heating system which is steady in its heating and may have component parts thereof readily converted for use as an air conditioning unit during the warm months of the year.

It is another object of this invention to provide a heating system which eliminates the uncleanliness and dangers inherent in the storage and the burning of combustible fuels.

It is still another object of this invention to provide a heating system which is compact and which requires the use of neither chimneys nor fuel storage facilities.

It is an additional object of this invention to provide a system of electrical heating which is simple, inexpensive and effective in operation.

Other objects may be seen and a fuller understanding of the invention may be had by referring to the following description and claims taken in conjunction with the accompanying drawings.

In accordance with one embodiment of this invention a heating system for a building is provided which comprises a main heater, a first control means for allowing automatic operation of the main heater during certain predetermined periods of time, a second control means for effecting operation of the main heater during the predetermined periods of time which are governed by the first control means, and an auxiliary or balance heater capable of supplying sufficient additional heat to maintain at least a balance between the actual heat lost by the building and the heat supplied to the building. The system is adapted for use with an electrical power source which is capable of supplying all of the energy required by the main heater and the auxiliary heater, if desired. The main heater is a slab type radiant heater including a plurality of heating elements which are either directly or indirectly heated by electricity. Under normal operating conditions a time switch or other similar device would permit automatic operation of the main heater elements only during certain predetermined periods of time. These predetermined periods of automatic operation would preferably be arranged to include the off-peak power demand periods, which usually occur during the late evening and early morning hours (i.e., 10 p.m.–6 a.m.) and briefly during the early afternoon. The main heater is thermostatically controlled so that the number of heating elements in operation during any predetermined periods of automatic operation is governed by the outdoor temperature. This is an important feature of this invention and permits additional heat to be put into the radiant heating slab before the heat loss is felt inside the house, thereby causing this heat to be radiated at exactly the time it would be most needed.

The auxiliary heater includes an air-to-air heat pump which is thermally sensitive to indoor temperature changes and operable to substantially maintain a balance between the heat lost by the building and the heat supplied to the building by all sources including the main heater, the sun, household heat producing activities, and the auxiliary heater.

For a more complete understanding of this invention, reference will now be made to the accompanying drawings, in which.

Figure 1:
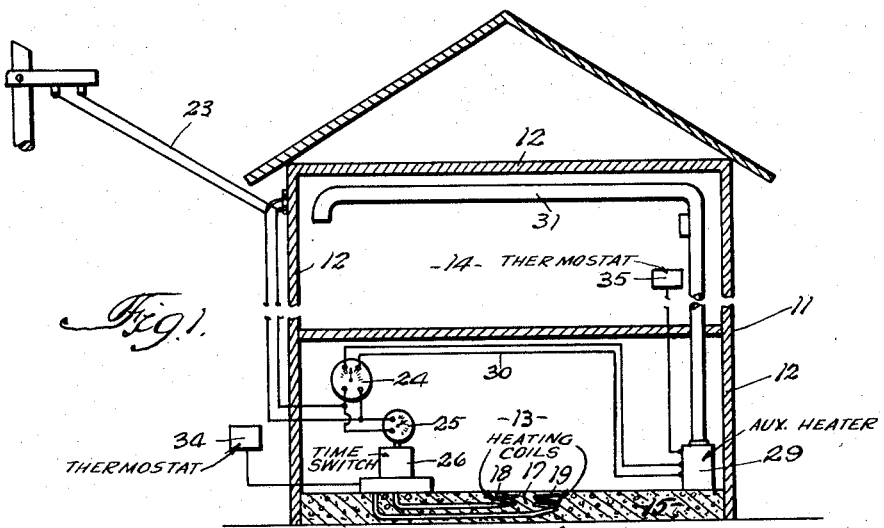
Figure 1 is a fragmentary vertical section of a building illustrating schematically the arrangement of the component parts of the heating system.

Referring more particularly to Fig. 1, a building 11 having insulation in the form of outside walls 12 or the like, is provided with a basement 13 and a first floor 14. The basement floor 15 is preferably constructed of concrete. In constructing this floor a vapor-proof membrane is first placed over the ground in order to isolate the floor slab, to be subsequently poured, from the ground dampness, and then a suitable edge insulation of approximately 4 inches of sand spread over the membrane. On top of this is poured an approximately 8-inch concrete slab.

Placed in basement floor 15 is a main heater, preferably a slab-type radiant heater. This radiant slab heater 17, in this instance, comprises a plurality of heating elements 18 and 19, which are elongated high resistance cables embedded in the slab. The number of heating elements utilized will depend upon the size of building to be heated and the amount of heating required. Power lines 23 from an outside electric power source enter the building through the basement wall and are connected to a conventional electric meter 24. Connected in parallel with the incoming power line and in front of meter 24 is a special meter 25. This special meter is connected to heater 17 through time switch control 26 which controls the periods of operation of heater 17 under normal automatic operating conditions. During these periods the electric power utilization is registered on meter 25.

An auxiliary heater 29, preferably in the form of a heat pump, is connected to the regular electric houseline 30, registering its electric power utilization on meter 24. A typical heat pump of the type suitable for use in the improved system consists of a reverse cycle refrigeration machine, the latter including condenser and evaporator elements, blower and motor assembly with suitable limit controls therefor, and an electric resistance heater having a capacity equal approximately to the heat output of the heat pump.

Duct work 31 is provided throughout the building enabling heat pump 29 to distribute its own heat and also the heat of the heating slab evenly throughout the building. An outside two-stage thermostat 34 is connected to the main or slab-type radiant heater 17 and controls the number of heating elements energized during the timed heating periods. An inside thermostat 35 is connected to the heat pump 29. The heat pump is thus rendered thermally responsive to indoor temperature changes and is operable to maintain a substantial balance between the actual heat lost by the building and the heat supplied to the building.

The time switch control 26 is set to permit automatic operation of the slab heater during predetermined periods of time. The timer is preferably set in such a manner that these predetermined periods of time include the off-peak power demand periods. These periods of low demand usually occur during the hours of from 10 p.m. to 6 a.m. and briefly during the afternoon, approximately between the hours of 1:30 and 3:30 p.m.

The coldest outdoor temperatures generally occur during the night-time off-peak period. As may be readily seen, these hours of operation cover the period of coldest weather, except during the afternoon off-peak period, when more moderate outdoor temperatures occur, at which time the system may if necessary be automatically energized.

Although any number of heating stages may be provided, depending upon the number of heating elements in the slab heater, there are preferably at least three stages of operation for the heating system. During the coldest outdoor temperatures, such as −10° F. to +15° F., both of the heating elements 19 and 20 would be in operation during the predetermined periods of time governed by the time switch control. During moderately cold weather, such as 15° F. to 35° F., only one of the heater elements would be in operation during these predetermined periods of time, the number of these elements in operation being governed by the outdoor thermostat. In mildly cold weather, such as 35° F. and warmer, the entire heating load could be handled by the heat pump.

Inasmuch as off-peak power is being used, a separate meter 25 may be provided in order to take advantage of the lower cost of this off-peak power. This special meter would register only the off-peak power input to the radiant heating slab under normal automatic operating conditions. The heat pump 29 may be provided with a resistance heating element in order to increase its heating capacity to such an extent that it will be more than capable of providing the balance of the heat necessary to heat the building and maintain the temperature of the building in the general temperature range of 65° to 80° F. The heat pump would also, as previously stated, be capable of providing air-conditioning during the summer months.

Figure 3:
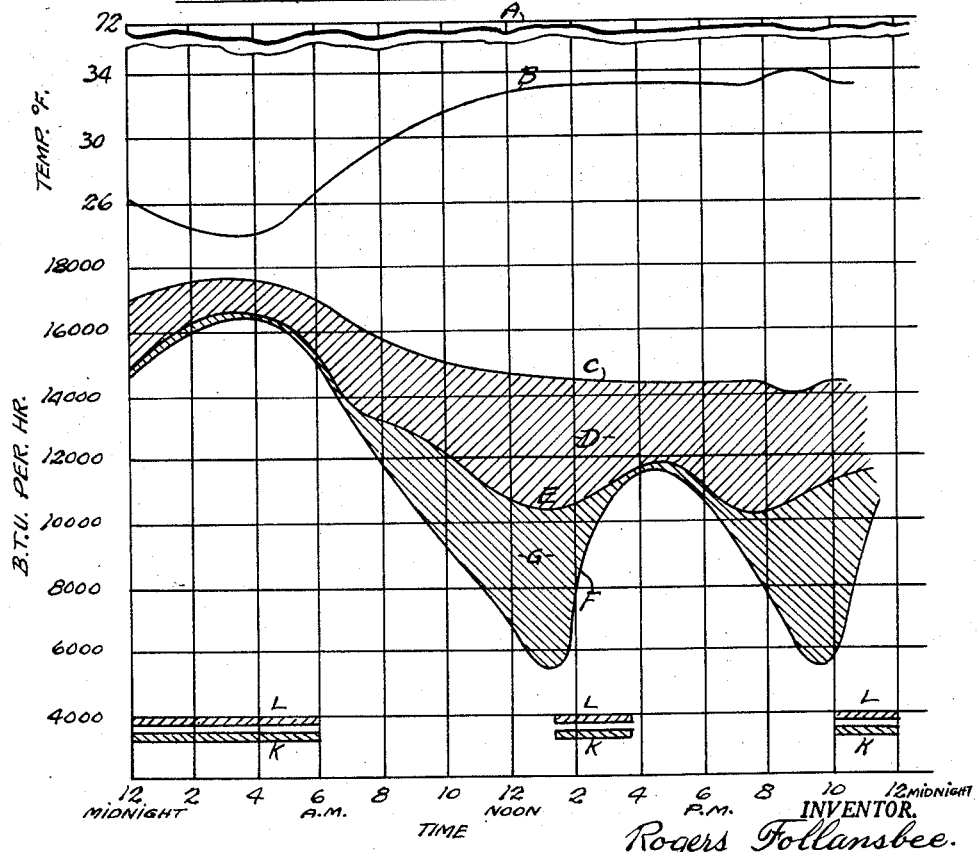
Fig. 3 is a graph illustrating operating cycle and performance results of the heating system during a dark, overcast and moderately cold winter day.
Figure 2:
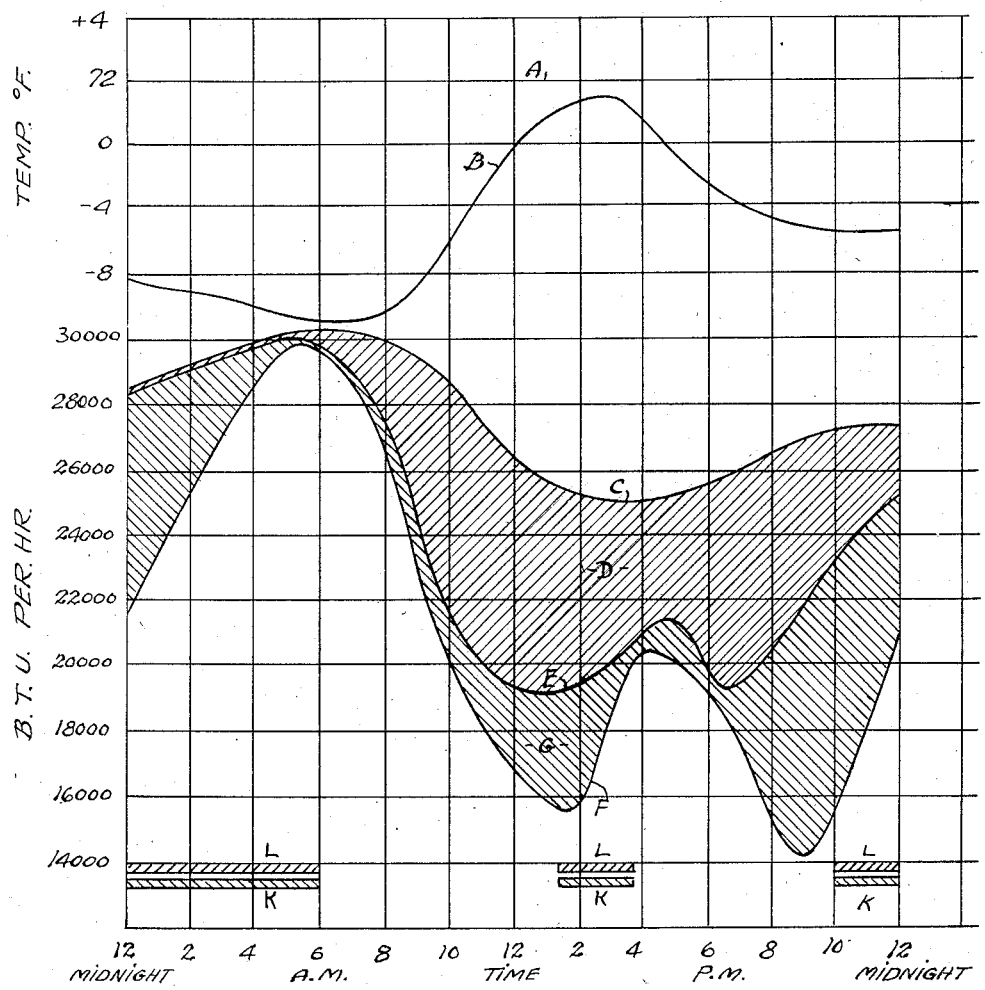
Fig. 2 is a graph illustrating the operating cycle and performance results of the heating system during a very cold but clear and sunny winter day.

Figs. 2 and 3 are graphs illustrating the performance results of the heating system during the most extreme temperature conditions under which a heating system would be required to operate. Fig. 2 illustrates the operating cycle and the performance results which actually would be experienced by the heating system during a very cold but clear and sunny winter day. Line A represents the constant temperature of 72° as maintained by the heating system during a 24-hour period. Line B is a plot of the outside temperatures during this period. Line C represents the heat loss of the building during the various intervals of the 24-hour period. Area D represents the heat supplied by the sun and heat producing activities carried on inside the building. Line E represents the amount of heat supplied by the entire heating system operating in accordance with this invention. Line F represents the heat supplied by the radiant slab during the various hours of the day. Area G represents the heat supplied by the heat pump during the various hours of the day. Horizontal bar K depicts the hours of electrical input into the radiant heating slab. Horizontal bar L represents the electric power low demand periods—that is, the off-peak power periods. These reference characters apply to both Figs. 2 and 3.

It may be seen from Fig. 2 that the outdoor temperature was approximately −9° F. at 12 midnight. Heat had been supplied to the slab for two hours prior to this time. Due to the fact that the outdoor temperature was −9°, two of the radiant heating elements were in operation. From 12 midnight up to 6 a.m. the slab had supplied from 21,000 to about 30,000 B.t.u.'s per hour.

It is possible to permit the slab input load to be automatically taken off the utility company system at 6 a.m. because of the sunrise and household activities, such as breakfast preparations, bathing, washing dishes, etc., supplying additional heat. The heat produced by these activities is represented by the area D. Although the input of heat to the slab had ceased, the slab continued to throw off a considerable amount of heat. This amount of heat thrown off by the slab decreased gradually to a low point occurring around 1:30 in the afternoon, at which time the slab was again heated and its heat output increased. It may be seen that the radiant slab continued to radiate heat throughout the day, although at a decreasing rate at times. This permitted the resistance heater of the heat pump, even with its comparatively low heating capacity, to maintain an even temperature throughout the building.

Fig. 3 illustrates the operating cycle and performance results of the heating system as actually would be experienced during a dark, overcast and moderately cold winter day. The outside temperature at 12 midnight was about 26° and heat was being put into the slab by one of the heating elements. At 6 a.m. the input to the slab is discontinued. By 7 a.m. the outdoor temperature had risen somewhat though the sun had not come out. The resistance heater in the heat pump automatically was turned on in order to compensate for the difference between the heat supplied by the slab and the other sources and the heat lost by the building. At about 12 noon the outdoor temperature began to level off at approximately 32° resulting in a slightly diminished heat loss. One stage of the slab's heat input started at 1:30 and continued until 3:30, the difference between the heat supplied by the slab and the other sources being made up by the heat pump and its resistance heating element.

The preferred design capacities for the individual elements of the heating system are as follows: a radiant slab capacity of 133% of the maximum heat loss and a capacity for the heat pump and resistance heating element of 33% of the maximum heat loss. This design provides a steadiness in heating as well as a quick response to rapidly changing outdoor temperature conditions.

The radiant slab heater is preferably designed in such a way that it may be manually operated at times other than those determined by the time switch control. This would probably require an additional circuit from the main electric line of the house so that the utilization of electric power through this line would be registered on the regular electric meter. The elements of the main heater will be indicated as being in the form of electric resistance heating cables; they might, if desired, be in the form of liquid conduits for circulating a liquid such as water, which could be electrically heated, throughout the radiant slab. Many other modifications and alterations may be made in this heating system without departing from the scope of the invention.

From the foregoing it may be seen that a heating system has been provided which utilizes off-peak power to reduce a major portion of its heat. In so using this power applicant's system also utilizes the heretofore disagreeable heat wasting fly wheel effect of slab type radiant heating systems, in order to store the heat put into the slab during the off-peak power periods and in order to transmit the correct amount of heat exactly when it is most needed. Applicant's system is an efficient and economical system and provides the first practical method for utilizing off-peak electric power as a major source of energy for heating purposes. With the installation of special meters and automatic switches the users of applicant's heating system would undoubtedly be given the advantage of a better rate for usage of electricity during the off-peak hours which in turn would increase the sale and utilization of other electrical devices by persuading customers to turn to all electric service. Applicant's system, as has been seen, provides a very steady heat and is functional during even the most difficult weather conditions.

Although the invention has been described with a certain degree of particularity it is to be understood that the present disclosure has been made only by way of example and that numerous changes in the details of construction and operation and the combination and arrangement of parts may be resorted to without departing from the spirit and scope of the invention as hereinafter claimed.

What is claimed is:

1. In an electric heating system for buildings, the combination of an electric power source, an electrically heated radiant slab, and a balance heater, said power source having generally predictable periods of high and low demand for the output of electrical energy, said radiant slab comprising a plurality of electrically energized heating elements operatively connected to the electric power source and operable at predetermined periods of time, said periods substantially corresponding with predicted periods of low demand upon the electrical output of said electric power source, a thermostatic control responsive to outdoor temperature changes for controlling the number of said slab heating elements operable during these predetermined periods of time, said balance heater being thermally responsive to indoor temperature changes and operable to maintain a substantial balance between the actual heat lost by the building and the heat supplied to the building.

2. In an electric heating system for buildings, the combination of an electric power source, an electrically heated radiant slab, and a balance heater, said power source having generally predictable periods of high and low demand for the output of electrical energy, said radiant slab comprising a plurality of electrically energized heating elements, said elements operatively connected to said electric power source for operation at predetermined priods of time, such periods substantially corresponding with predicted periods of low demand upon the electrical output of said power source, a thermostatic control responsive to outdoor temperature changes for controlling the number of said electric slab heating elements operable during these predetermined periods of time, said control being operable to effect operation of at least one of the elements over a mildly cold outdoor temperature range and at least two of the elements over an adjoining colder outdoor temperature range, said balance heater being thermally responsive to indoor temperature changes and operable to maintain a substantial balance between the actual heat lost by the building and the heat supplied to the building.

3. In an electric heating system for a building provided with a basement having a concrete floor, the combination of an electric power source, an electrically heated radiant concrete slab integral with the basement floor of said building, and a balance heater, said power source having generally predictable periods of high and low demand for the output of electrical energy, said radiant slab comprising a plurality of electrically energized heating elements, said elements operatively connected to said electric power source for operation at predetermined periods of time, such periods substantially corresponding with predicted periods of low demand upon the electrical output of said power source, a thermostatic control responsive to outdoor temperature changes for controlling the number of said electric slab heating elements operable during these predetermined periods of time, said control being operable to effect operation of at least one of the elements over a mildly cold outdoor temperature range and at least two of the elements over an adjoining colder outdoor temperature range, said balance heater being thermally responsive to indoor temperature changes and operable to maintain a substantial balance between the actual heat lost by the building and the heat supplied to the building.

4. The heating system recited in claim 2 in which the balance heater is an air to air heat pump.

5. The heating system recited in claim 4 in which the heat produced by heating elements in the radiant slab is distributed throughout the building by the air to air heat pump.

6. A uniform radiant heating method for heating a building which has a calculable daily heat loss and is equipped with an electrically heated slab, said method comprising energizing at least one of a plurality of electrical elements within said radiant heating slab during the period of greatest calculated heat loss and for a short time during the period substantially equidistant between the average daily occurrence of these periods of greatest calculated heat loss, controlling by outdoor temperature the number of electrical elements to be energized at any one time supplying by means of an air to air heat pump sufficient heat to maintain a substantial balance between the actual heat lost by the building and the heat supplied to the building.

7. The uniform radiant heating method of claim 6 wherein the minimum capacity of the radiant heating slab is 1.33 times the calculated heat loss of the building and the minimum capacity of the air to air heat pump is 0.33 times the calculated heat loss of the building.

8. In a system for heating a building, a heat transfer means, a plurality of heat supplying elements for supplying heat to said heat transfer means, auxiliary heating means, said heat supplying elements operable at predetermined periods of time, the number of said elements operable during these predetermined periods of time being thermostatically dependent upon the outdoor temperature, said auxiliary heating means being thermally responsive to indoor temperature changes and operable to maintain a substantial balance between the actual heat lost by the building and the heat supplied to the building.

9. In a system for heating buildings, a heat transfer means, a main heating means for supplying heat to said heat transfer means, a time switch connected to said main heating means and capable of restricting the automatic operation of said main heating means to certain predetermined periods of time, a thermostatic control connected to said main heating means and thermally responsive to outdoor temperatures to effect operation of said heating means during said predetermined periods of time, an auxiliary heating means, and a thermostatic control connected to said auxiliary heating means and thermally responsive to indoor temperature changes to effect operation of said auxiliary heating means to maintain a substantial balance between the actual heat lost by the building and the heat supplied to the building.

References Cited in the file of this patent
UNITED STATES PATENTS

| | | |
|---|---|---|
| 2,165,970 | Jaspers | July 11, 1939 |
| 2,241,070 | McLenegan | May 6, 1941 |
| 2,483,896 | Gay | Oct. 4, 1949 |
| 2,503,600 | Tice | Apr. 11, 1950 |
| 2,549,952 | Wheelock | Apr. 24, 1951 |
| 2,784,945 | Fodor | Mar. 12, 1957 |